United States Patent
Kapinos et al.

(10) Patent No.: US 10,678,900 B2
(45) Date of Patent: Jun. 9, 2020

(54) APPARATUS, METHOD, AND PROGRAM PRODUCT FOR CONTROLLING A BIOMETRIC READER

(71) Applicant: LENOVO (Singapore) PTE. LTD., New Tech Park (SG)

(72) Inventors: Robert James Kapinos, Durham, NC (US); Russell Speight VanBlon, Raleigh, NC (US); Scott Wentao Li, Cary, NC (US); Robert James Norton, Jr., Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 56 days.

(21) Appl. No.: 16/013,547

(22) Filed: Jun. 20, 2018

(65) Prior Publication Data
US 2019/0392127 A1    Dec. 26, 2019

(51) Int. Cl.
*G06F 21/00* (2013.01)
*G06F 21/32* (2013.01)

(52) U.S. Cl.
CPC .................... *G06F 21/32* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 2011/0185401 A1* | 7/2011 | Bak | G06F 16/9024 726/5 |
| 2011/0193727 A1* | 8/2011 | Goto | G06F 3/03547 341/20 |
| 2016/0308848 A1* | 10/2016 | Jakobsson | H04L 63/08 |
| 2017/0091512 A1* | 3/2017 | Kumano | G06F 3/011 |
| 2017/0116455 A1* | 4/2017 | Alameh | G06F 1/3215 |
| 2017/0346635 A1* | 11/2017 | Gummeson | G06F 1/16 |
| 2018/0004927 A1* | 1/2018 | Lowe | G06F 21/83 |
| 2018/0247039 A1* | 8/2018 | Yoon | G06F 21/32 |

* cited by examiner

*Primary Examiner* — Jeffrey C Pwu
*Assistant Examiner* — William A Corum, Jr.
(74) *Attorney, Agent, or Firm* — Kunzler Bean & Adamson (57) ABSTRACT

Apparatuses, methods, and program products are disclosed for controlling a biometric reader. One apparatus includes a processor and a memory that stores code executable by the processor. The code is executable by the processor to determine, by use of the processor, whether a movement of the apparatus crosses a threshold. The code is executable by the processor to, in response to the movement of the apparatus crossing the threshold, adjust a biometric authentication algorithm. The code is executable by the processor to control a biometric reader based on the adjusted biometric authentication algorithm.

20 Claims, 6 Drawing Sheets

APPARATUS, METHOD, AND PROGRAM PRODUCT FOR CONTROLLING A BIOMETRIC READER

FIELD

The subject matter disclosed herein relates to biometrics and more particularly relates to controlling a biometric reader.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Authentication may be used to access an information handling device. Such authentication may be performed using a biometric reader. An authentication attempt via the biometric reader may inadvertently be initiated.

BRIEF SUMMARY

An apparatus for controlling a biometric reader is disclosed. A method and computer program product also perform the functions of the apparatus. In one embodiment, the apparatus includes a processor and a memory that stores code executable by the processor. The code, in various embodiments, is executable by the processor to determine, by use of the processor, whether a movement of the apparatus crosses a threshold. The code, in certain embodiments, is executable by the processor to, in response to the movement of the apparatus crossing the threshold, adjust a biometric authentication algorithm. The code, in some embodiments, is executable by the processor to control a biometric reader based on the adjusted biometric authentication algorithm.

In some embodiments, the code executable by the processor adjusts the biometric authentication algorithm by ignoring authentication attempts made using the biometric reader after the movement of the apparatus crosses the threshold. In one embodiment, the code executable by the processor ignores the authentication attempts made using the biometric reader after the movement of the apparatus crosses the threshold by disabling authentication using the biometric reader after the movement of the apparatus crosses the threshold.

In various embodiments, the code executable by the processor ignores the authentication attempts made using the biometric reader after the movement of the apparatus crosses the threshold by ignoring unsuccessful attempts made using the biometric reader after the movement of the apparatus crosses the threshold and accepting successful attempts made using the biometric reader after the movement of the apparatus crosses the threshold. In some embodiments, the code executable by the processor adjusts the biometric authentication algorithm by increasing a number of authentication attempts available to be made using the biometric reader after the movement of the apparatus crosses the threshold. In certain embodiments, the code executable by the processor determines whether the movement of the information handling device crosses the threshold by determining whether the movement of the information handling device indicates a transition from a first movement pattern to a second movement pattern.

A method for controlling a biometric reader, in one embodiment, includes determining, by use of a processor, whether a movement of an information handling device crosses a threshold. In certain embodiments, the method includes, in response to the movement of the information handling device crossing the threshold, adjusting a biometric authentication algorithm. In some embodiments, the method includes controlling a biometric reader based on the adjusted biometric authentication algorithm.

In some embodiments, determining whether the movement of the information handling device crosses the threshold includes determining whether the movement of the information handling device crosses an acceleration threshold. In various embodiments, determining whether the movement of the information handling device crosses the threshold includes determining whether the movement of the information handling device crosses a velocity threshold. In one embodiment, determining whether the movement of the information handling device crosses the threshold includes determining whether the movement of the information handling device indicates a transition from a first movement pattern to a second movement pattern.

In some embodiments, adjusting the biometric authentication algorithm includes ignoring authentication attempts made using the biometric reader after the movement of the information handling device crosses the threshold. In certain embodiments, ignoring the authentication attempts made using the biometric reader after the movement of the information handling device crosses the threshold includes disabling authentication using the biometric reader after the movement of the information handling device crosses the threshold.

In some embodiments, ignoring the authentication attempts made using the biometric reader after the movement of the information handling device crosses the threshold includes ignoring unsuccessful attempts made using the biometric reader after the movement of the information handling device crosses the threshold and may include accepting successful attempts made using the biometric reader after the movement of the apparatus crosses the threshold. In various embodiments, adjusting the biometric authentication algorithm includes increasing a number of authentication attempts available to be made using the biometric reader after the movement of the information handling device crosses the threshold. In certain embodiments, the method includes adjusting the biometric authentication algorithm in response to the movement of the information handling device crossing the threshold a second time.

In one embodiment, a program product includes a computer readable storage medium that stores code executable by a processor. The executable code, in certain embodiments, includes code to perform determining, by use of the processor, whether a movement of an information handling device crosses a threshold. The executable code, in various embodiments, includes code to perform, in response to the movement of the information handling device crossing the threshold, adjusting a biometric authentication algorithm. The executable code, in some embodiments, includes code to perform controlling a biometric reader based on the adjusted biometric authentication algorithm.

In certain embodiments, the executable code further includes code to perform determining whether the movement of the information handling device crosses the threshold by determining whether the movement of the information handling device crosses a threshold selected from a group including an acceleration threshold and a velocity threshold.

In one embodiment, the executable code further includes code to perform determining whether the movement of the information handling device crosses the threshold by determining whether the movement of the information handling device indicates a transition from a first movement pattern to a second movement pattern. In certain embodiments, the executable code further includes code to perform adjusting the biometric authentication algorithm by ignoring authentication attempts made using the biometric reader after the movement of the information handling device crosses the threshold. In various embodiments, the executable code further includes code to perform adjusting the biometric authentication algorithm by increasing a number of authentication attempts available to be made using the biometric reader after the movement of the information handling device crosses the threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
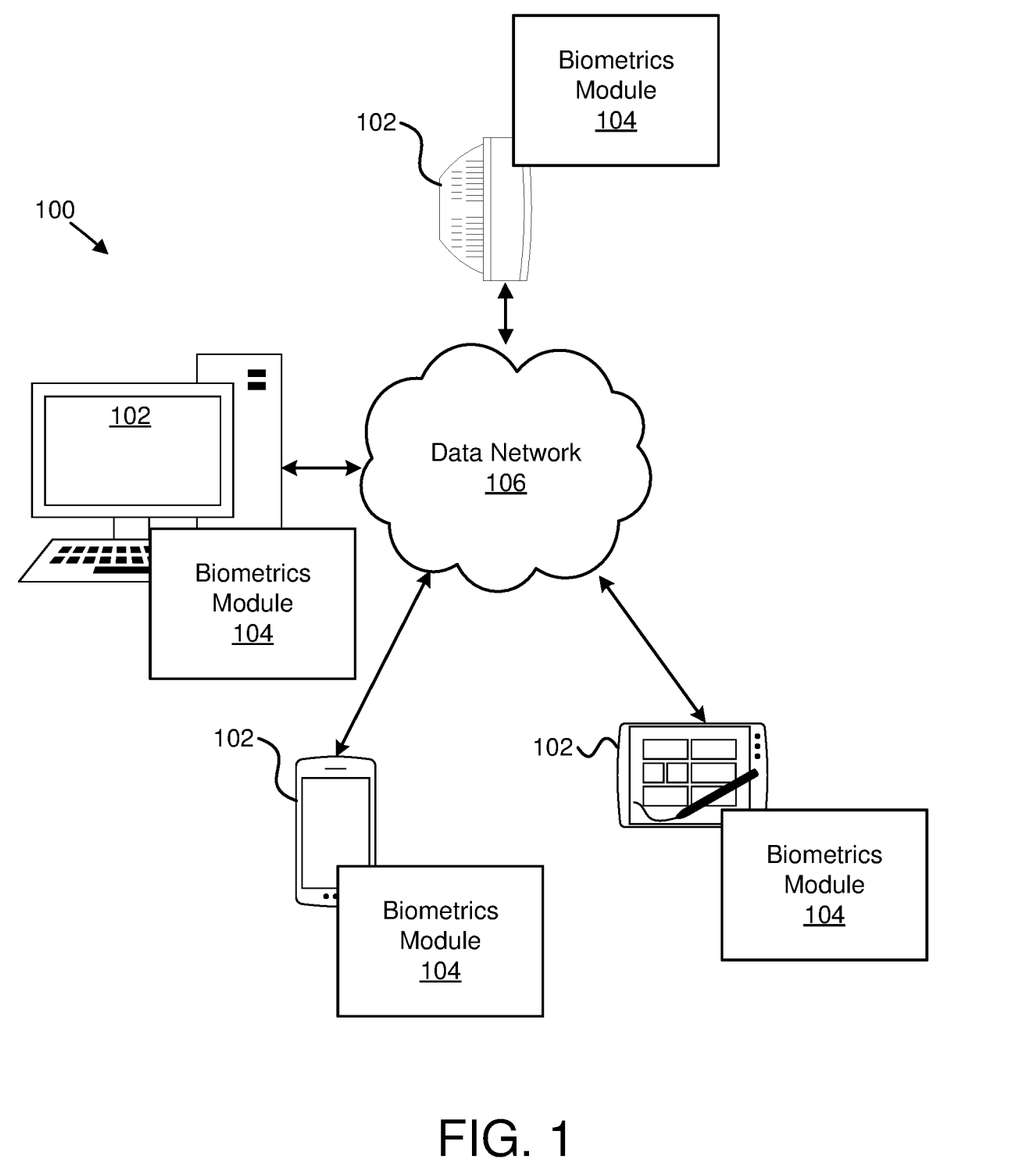
FIG. 1 is a schematic block diagram illustrating one embodiment of a system for controlling a biometric reader.

FIG. 1 depicts one embodiment of a system 100 for controlling a biometric reader. In one embodiment, the system 100 includes information handling devices 102, biometric modules 104, and data networks 106. Even though a specific number of information handling devices 102, biometric modules 104, and data networks 106 are depicted in FIG. 1, one of skill in the art will recognize that any number of information handling devices 102, biometric modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the biometric module 104. In certain embodiments, the biometric module 104 may determine, by use of a processor, whether a movement of an information handling device 102 crosses a threshold. The biometric module 104 may also, in response to the movement of the information handling device 102 crossing the threshold, adjust a biometric authentication algorithm. The biometric module 104 may control a biometric reader based on the adjusted biometric authentication algorithm. In this manner, the biometric module 104 may be used for controlling a biometric reader.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
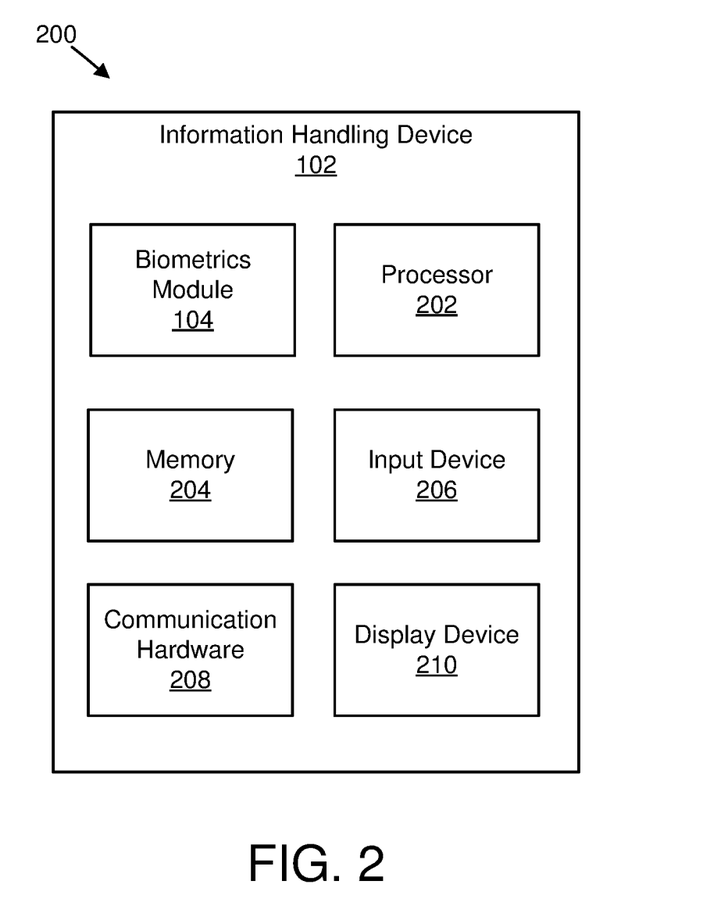
FIG. 2 is a schematic block diagram illustrating one embodiment of an apparatus including an information handling device.

FIG. 2 depicts one embodiment of an apparatus 200 that may be used for controlling a biometric reader. The apparatus 200 includes one embodiment of the information handling device 102. Furthermore, the information handling device 102 may include the biometric module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the biometric module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to biometric readers. In some embodiments, the memory 204 also stores program code and related data, such as an operating system or other controller algorithms operating on the information handling device 102.

The information handling device 102 may use the biometric module 104 for controlling a biometric reader. As may be appreciated, the biometric module 104 may include computer hardware, computer software, or a combination of both computer hardware and computer software. For example, the biometric module 104 may include circuitry, or a processor, used to determine, by use of the processor 202, whether a movement of an information handling device 102 crosses a threshold. As another example, the biometric module 104 may include computer program code that, in response to the movement of the information handling device 102 crossing the threshold, adjusting a biometric authentication algorithm. As a further example, the biometric module 104 may include computer program code that controls a biometric reader based on the adjusted biometric authentication algorithm.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the biometric module 104.

Figure 3:
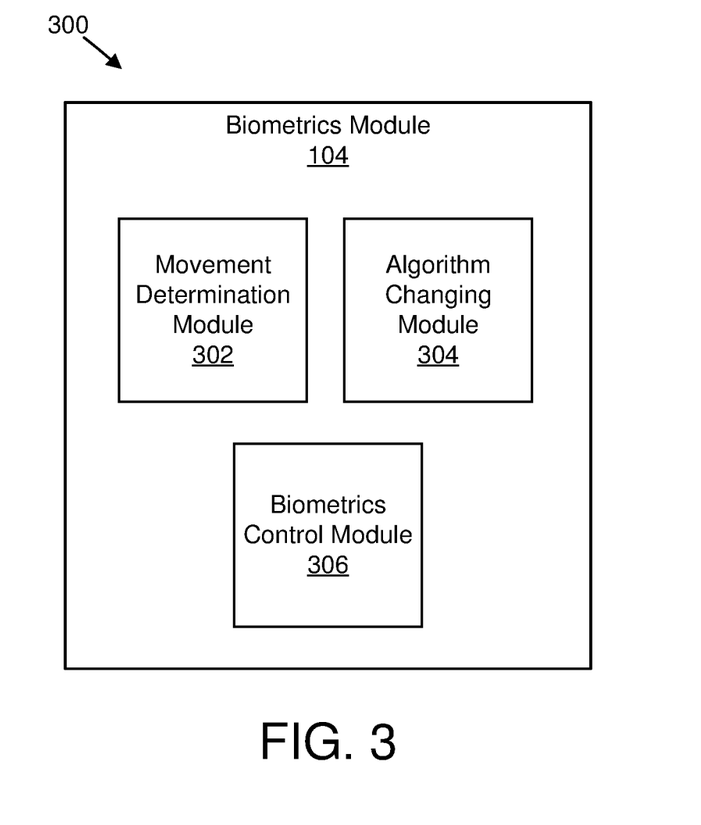
FIG. 3 is a schematic block diagram illustrating one embodiment of an apparatus including a biometrics module.

FIG. 3 depicts a schematic block diagram illustrating one embodiment of an apparatus 300 that includes one embodiment of the biometric module 104. Furthermore, the biometric module 104 includes a movement determination module 302, an algorithm changing module 304, and a biometrics control module 306.

In certain embodiments, the movement determination module 302 may determine (e.g., by use of a processor) whether a movement of an information handling device 102 is greater than, less than, and/or crosses a threshold. The threshold may be set based on a size and/or weight of the information handling device 102. In some embodiments, the movement determination module 302 may determine whether the movement of the information handling device 102 is greater than, less than, and/or crosses an acceleration threshold. For example, the movement determination module 302 may include an accelerometer and/or gyroscope used to detect an acceleration of the information handling device 102.

The movement determination module 302 may determine whether a detected acceleration crosses an acceleration threshold. The acceleration threshold may indicate a change in movement of the information handling device 102 from a first type of movement (e.g., movement pattern) to a second type of movement (e.g., movement pattern). For example, the acceleration threshold may indicate that the information handling device 102 transitions from an acceleration indicating that the information handling device 102 is in a user's pocket to an acceleration indicating that the information handling device 102 is removed from the user's pocket. Conversely, the acceleration threshold may indicate that the information handling device 102 transitions from an acceleration indicating that the information handling device 102 is outside a user's pocket to an acceleration indicating that the information handling device 102 is inside the user's pocket. In other embodiments, the acceleration threshold may indicate that the information handling device 102: transitions from resting to moving, transitions from a moving to resting, transitions from a slow movement to a fast movement, transitions from a fast movement to a slow movement, transitions from a patterned movement (e.g., like in the pocket of a person sitting or walking) to a sporadic movement (e.g., like being picked up), transitions from a sporadic movement to a patterned movement, transitions from being held in a hand to not being held in a hand, transitions from not being held in a hand to being held in a hand, transitions from being in a container to being out of the container, transitions from being out of a container to being in the container, and so forth. In one embodiment, the movement determination module 302 may determine whether the movement of the information handling device 102 indicates a transition from a first movement pattern to a second movement pattern.

In various embodiments, the movement determination module 302 may determine whether the movement of the information handling device 102 crosses a velocity threshold. The velocity threshold may indicate a change in movement of the information handling device 102 from a first type of movement (e.g., movement pattern) to a second type of movement (e.g., movement pattern). For example, the acceleration threshold may indicate that the information handling device 102 transitions from a velocity indicating that the information handling device 102 is in a user's pocket to a velocity indicating that the information handling device 102 is removed from the user's pocket. Conversely, the velocity threshold may indicate that the information handling device 102 transitions from a velocity indicating that the information handling device 102 is outside a user's pocket to a velocity indicating that the information handling device 102 is inside the user's pocket. In other embodiments, the velocity threshold (or another type of threshold) may indicate that the information handling device 102: transitions from resting to moving, transitions from a moving to resting, transitions from a slow movement to a fast movement, transitions from a fast movement to a slow movement, transitions from a patterned movement (e.g., like in the pocket of a person sitting or walking) to a sporadic movement (e.g., like being picked up), transitions from a sporadic movement to a patterned movement, transitions from being held in a hand to not being held in a hand, transitions from not being held in a hand to being held in a hand, transitions from being in a container to being out of the container, transitions from being out of a container to being in the container, and so forth.

In one embodiment, the algorithm changing module 304 may, in response to the movement of the information handling device 102 crossing the threshold, adjust a biometric authentication algorithm. It should be noted that the adjustment to the biometric authentication algorithm may only last until the movement of the information handling device 102 crosses the threshold a second time. For example, crossing the threshold a first time (e.g., crossing from being below the threshold to being above the threshold, crossing from being above the threshold to being below the threshold, etc.) may trigger an adjustment to the biometric authentication algorithm, and crossing the threshold a second time (e.g., crossing back from being above the threshold to being below the threshold, crossing back being below the threshold to being above the threshold, etc.) may trigger returning the biometric authentication algorithm to its original state.

As may be appreciated, a user of the information handling device 102 may inadvertently activate a biometric reader in response to picking up the information handling device 102 and/or in response to removing the information handling device 102 from the user's pocket. By detecting that the user of the information handling device 102 is picking up the information handling device 102 and/or removing the information handling device 102 from the user's pocket (e.g., by determining movement of the information handling device 102 crossing the threshold), the information handling device 102 may adjust the biometric authentication algorithm so that the biometric reader is not inadvertently activated and/or so that an authentication attempt detected by the biometric reader does not count against a user's authentication attempt limit, thereby improving the functionality of the information handling device 102.

In certain embodiments, adjusting the biometric authentication algorithm includes ignoring authentication attempts made using a biometric reader after the movement of the information handling device 102 crosses the threshold, and before movement of the information handling device 102 returns from crossing the threshold. The biometric reader may be any suitable reader of the information handling device 102 that uses biometrics of the user for authentication. For example, the biometric reader may be a fingerprint scanner, a retinal scanner, and so forth. In some embodiments, ignoring the authentication attempts made using the biometric reader after the movement of the information handling device 102 crosses the threshold includes disabling authentication using the biometric reader after the movement of the information handling device 102 crosses the threshold, and before movement of the information handling device 102 returns from crossing the threshold. In various embodiments, ignoring the authentication attempts made using the biometric reader after the movement of the information handling device 102 crosses the threshold includes ignoring unsuccessful (e.g., failed) attempts made using the biometric reader after the movement of the information handling device 102 crosses the threshold, and before movement of the information handling device 102 returns from crossing the threshold.

In certain embodiments, adjusting the biometric authentication algorithm includes increasing a number of authentication attempts available to be made using the biometric reader after the movement of the information handling device 102 crosses the threshold, and before movement of the information handling device 102 returns from crossing the threshold. In some embodiments, a user may be able to set the number of authentication attempts. In various embodiments, the number of authentication attempts available before locking out a user (e.g., not allowing successful authentication attempts) and/or rejecting authentication attempts (e.g., not allowing any authentication attempts) may be set to a fixed number and/or may be set to be unlimited. For example, the number of unsuccessful authentication attempts available before locking out a user and/or rejecting authentication attempts may be set low (e.g., to a single digit number) or the number of unsuccessful authentication attempts available before locking out a user and/or rejecting authentication attempts may be set high (e.g., to a double-digit number or higher). In certain embodiments, adjusting the biometric authentication algorithm includes resetting a number of failed authentication attempts to zero after the movement of the information handling device 102 returns from crossing the threshold (e.g., crosses the threshold a second time).

In some embodiments, adjusting the biometric authentication algorithm includes ignoring an unlimited number of unsuccessful authentication attempts unless a gap time between tries is within a certain threshold. For example, if the gap time between detected unsuccessful authentication attempts is short (e.g., less than 1 second, less than 3 seconds, less than 5 seconds), a limited number of unsuccessful authentication attempts may be ignored. In certain embodiments, unsuccessful authentication attempts may be separated into categories, such as unsuccessful authentication attempts that have some data and/or are partially successful, and unsuccessful authentication attempts that have no biometric data. In such embodiments, the unsuccessful authentication attempts that have some data and/or are partially successful may be limited to some number before locking out a user, while the unsuccessful authentication attempts that have no biometric data may be unlimited so that a user is not locked out. In various embodiments, the information handling device 102 may have a first mode in which the information handling device 102 transitions to not accepting any authentication attempts for a period of time in which a biometric sensor receives data input intermittently before and/or during the period of time. In such embodiments, the information handling device 102 may have a second mode in which the information handling device 102 only ignores unsuccessful authentication attempts. The information handling device 102 may transition from the first mode to the second mode after some time period of receiving no data input.

In various embodiments, the biometrics control module 306 may control a biometric reader based on the adjusted biometric authentication algorithm. In some embodiments, the biometric control module 306 may enable a user to select whether the biometric reader operates based on the adjusted biometric authentication algorithm.

Figure 4:
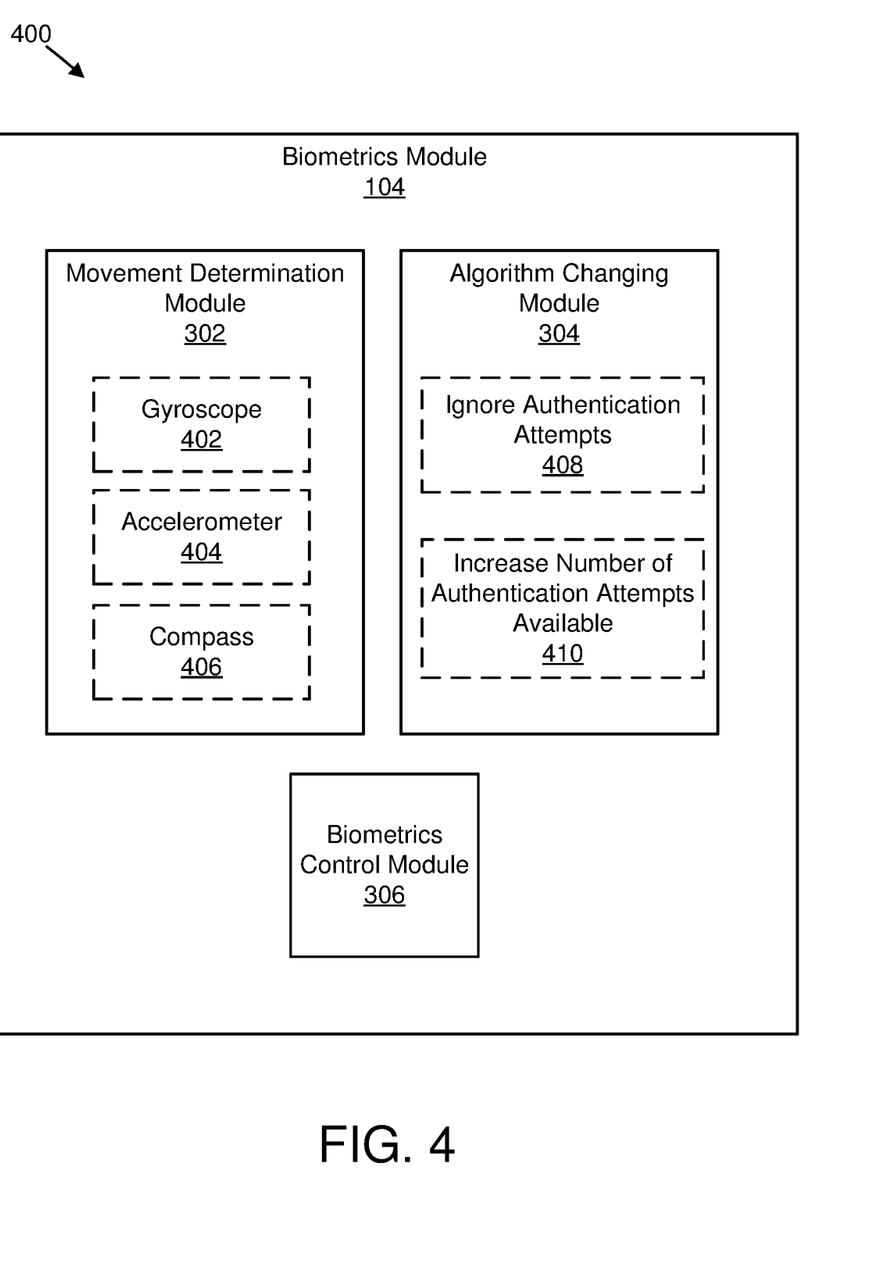
FIG. 4 is a schematic block diagram illustrating another embodiment of an apparatus including a biometrics module.

FIG. 4 is a schematic block diagram illustrating another embodiment of an apparatus 400 that includes one embodiment of the biometric module 104. Furthermore, the biometric module 104 includes one embodiment of the movement determination module 302, the algorithm changing module 304, and the biometrics control module 306, that may be substantially similar to the movement determination module 302, the algorithm changing module 304, and the biometrics control module 306 described in relation to FIG. 3. The movement determination module 302 optionally includes a gyroscope 402, an accelerometer 404, and/or a compass 406. The algorithm changing module 304 may include ignoring authentication attempts 408 and/or increasing a number of authentication attempts available 410.

The gyroscope 402 may be any suitable type of device usable to determine an orientation of a device and/or directional movement of a device. Thus, movement of the information handling device 102 that crosses a threshold may be detected by the gyroscope 402. The accelerometer 404 may be any suitable type of device usable to determine an acceleration of a device. Thus, movement of the information handling device 102 that crosses a threshold may be detected by the accelerometer 404. The compass 406 may be any suitable type of device usable to determine an orientation of a device. Thus, movement of the information handling device 102 that crosses a threshold may be detected by the compass 406.

Ignoring authentication attempts 408 may include disabling a biometric reader, ignoring information from a biometric reader, not incrementing a number of failed authentication attempts, setting a number of failed authentication attempts to zero, and so forth. Increasing a number of authentication attempts available 410 may include setting a number of attempts available to an unlimited number and/or a high number, disabling authentication, and so forth.

Figure 5:
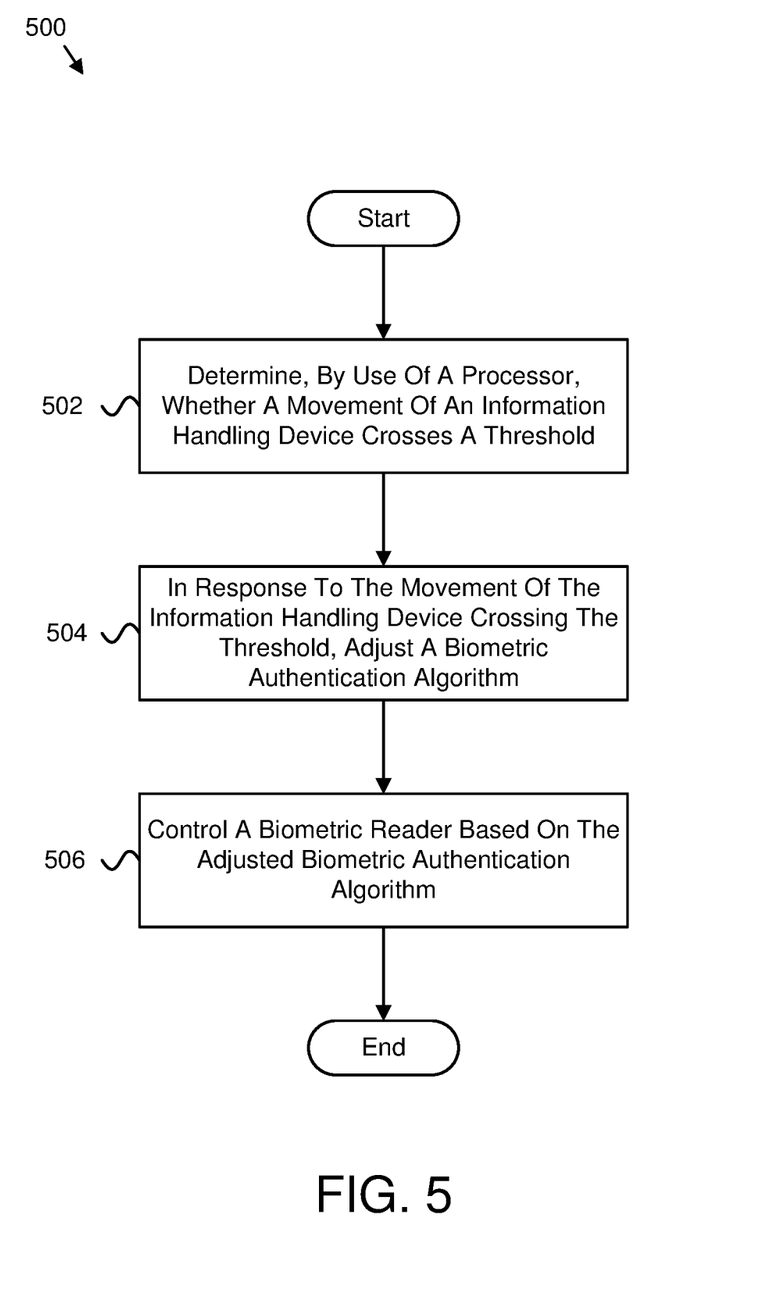
FIG. 5 is a schematic flow chart diagram illustrating an embodiment of a method for controlling a biometric reader.

FIG. 5 is a schematic flow chart diagram illustrating an embodiment of a method 500 for controlling a biometric reader. In some embodiments, the method 500 is performed by an apparatus, such as the information handling device 102. In other embodiments, the method 500 may be performed by a module, such as the biometric module 104. In certain embodiments, the method 500 may be performed by a processor executing program code, for example, a microcontroller, a microprocessor, a CPU, a GPU, an auxiliary processing unit, a FPGA, or the like.

The method 500 may include determining 502, by use of a processor (e.g., the processor 202), whether a movement of an information handling device 102 crosses a threshold. In certain embodiments, the movement determination module 302 may determine 502 whether the movement of the information handling device 102 crosses the threshold. In some embodiments, determining 502 whether the movement of the information handling device 102 crosses the threshold includes determining whether the movement of the information handling device 102 crosses an acceleration threshold. In various embodiments, determining 502 whether the movement of the information handling device 102 crosses the threshold includes determining whether the movement of the information handling device 102 crosses a velocity threshold. In one embodiment, determining 502 whether the movement of the information handling device 102 crosses the threshold includes determining whether the movement of the information handling device 102 indicates a transition from a first movement pattern to a second movement pattern.

The method 500 may include, in response to the movement of the information handling device 102 crossing the threshold, adjusting 504 a biometric authentication algorithm. In some embodiments, the algorithm changing module 304 may adjust 504 the biometric authentication algorithm in response to the movement of the information handling device 102 crossing the threshold. In certain embodiments, adjusting 504 the biometric authentication algorithm includes ignoring authentication attempts made using the biometric reader after the movement of the information handling device 102 crosses the threshold. In some embodiments, ignoring the authentication attempts made using the biometric reader after the movement of the information handling device 102 crosses the threshold includes disabling authentication using the biometric reader after the movement of the information handling device 102 crosses the threshold. In various embodiments, ignoring the authentication attempts made using the biometric reader after the movement of the information handling device 102 crosses the threshold includes ignoring unsuccessful attempts made using the biometric reader after the movement of the information handling device 102 crosses the threshold and may include accepting successful attempts made using the biometric reader after the movement of the apparatus crosses the threshold. In certain embodiments, adjusting 504 the biometric authentication algorithm includes increasing a number of authentication attempts available to be made using the biometric reader after the movement of the information handling device 102 crosses the threshold.

The method 500 may include controlling 506 a biometric reader based on the adjusted biometric authentication algorithm, and the method 500 may end. In some embodiments, the biometrics control module 306 may control 506 the biometric reader based on the adjusted biometric authentication algorithm.

In some embodiments, the method 500 includes adjusting the biometric authentication algorithm in response to the movement of the information handling device 102 crossing the threshold a second time.

Figure 6:
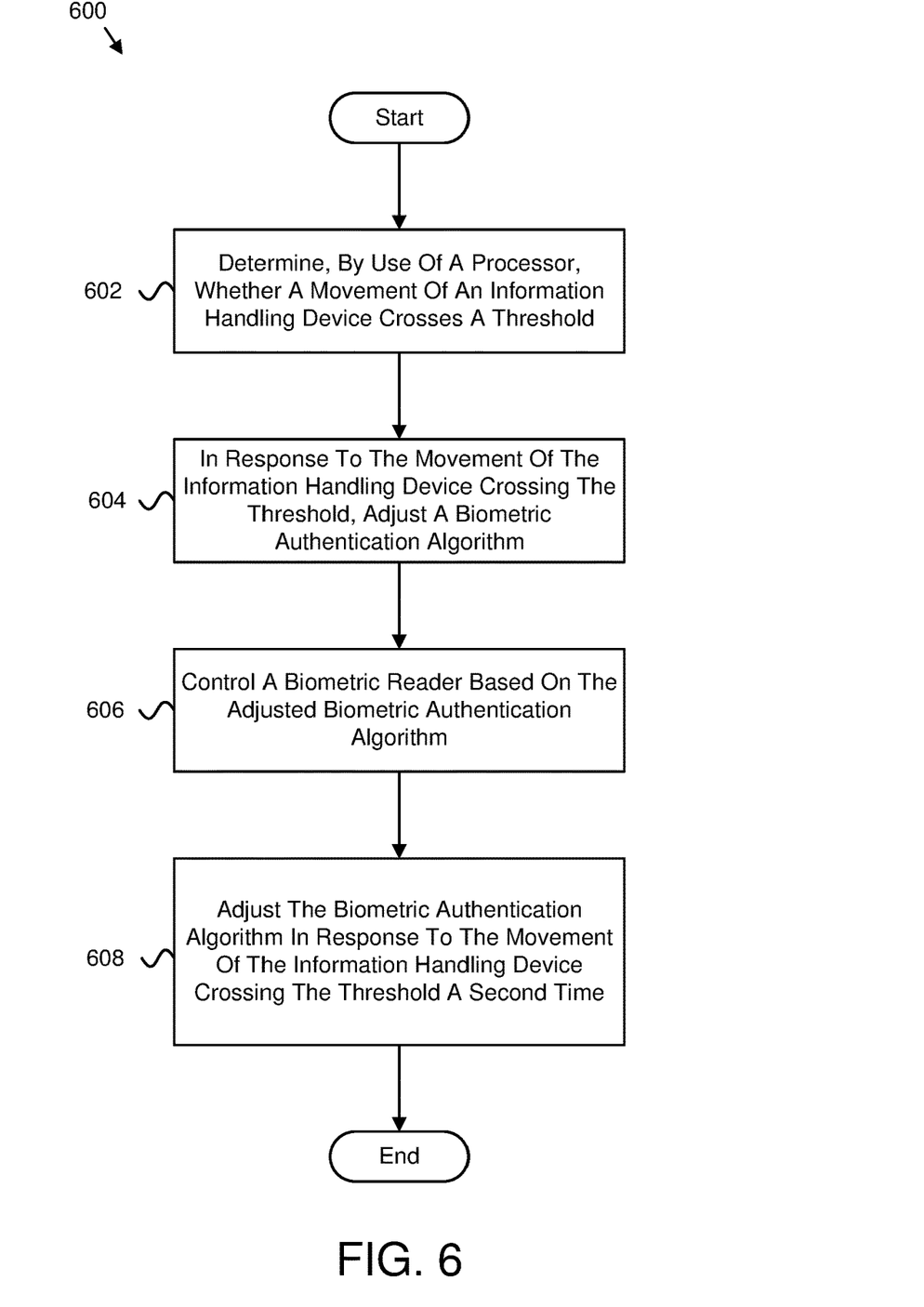
FIG. 6 is a schematic flow chart diagram illustrating another embodiment of a method for controlling a biometric reader.

FIG. 6 is a schematic flow chart diagram illustrating another embodiment of a method 600 for controlling a biometric reader. In some embodiments, the method 600 is performed by an apparatus, such as the information handling device 102. In other embodiments, the method 600 may be performed by a module, such as the biometric module 104. In certain embodiments, the method 600 may be performed by a processor executing program code, for example, a microcontroller, a microprocessor, a CPU, a GPU, an auxiliary processing unit, a FPGA, or the like.

The method 600 may include determining 602, by use of a processor (e.g., the processor 202), whether a movement of an information handling device 102 crosses a threshold. In certain embodiments, the movement determination module 302 may determine 602 whether the movement of the information handling device 102 crosses the threshold. In some embodiments, determining 602 whether the movement of the information handling device 102 crosses the threshold includes determining whether the movement of the information handling device 102 crosses an acceleration threshold. In various embodiments, determining 602 whether the movement of the information handling device 102 crosses the threshold includes determining whether the movement of the information handling device 102 crosses a velocity threshold. In one embodiment, determining 602 whether the movement of the information handling device 102 crosses the threshold includes determining whether the movement of the information handling device 102 indicates a transition from a first movement pattern to a second movement pattern.

The method 600 may include, in response to the movement of the information handling device 102 crossing the threshold, adjusting 604 a biometric authentication algorithm. In some embodiments, the algorithm changing module 304 may adjust 604 the biometric authentication algorithm in response to the movement of the information handling device 102 crossing the threshold. In certain embodiments, adjusting 604 the biometric authentication algorithm includes ignoring authentication attempts made using the biometric reader after the movement of the information handling device 102 crosses the threshold. In some embodiments, ignoring the authentication attempts made using the biometric reader after the movement of the information handling device 102 crosses the threshold includes disabling authentication using the biometric reader after the movement of the information handling device 102 crosses the threshold. In various embodiments, ignoring the authentication attempts made using the biometric reader after the movement of the information handling device 102 crosses the threshold includes ignoring unsuccessful attempts made using the biometric reader after the movement of the information handling device 102 crosses the threshold and may include accepting successful attempts made using the biometric reader after the movement of the apparatus crosses the threshold. In certain embodiments, adjusting 604 the biometric authentication algorithm includes increasing a number of authentication attempts available to be made using the biometric reader after the movement of the information handling device 102 crosses the threshold.

The method 600 may include controlling 606 a biometric reader based on the adjusted biometric authentication algorithm. In some embodiments, the biometrics control module 306 may control 606 the biometric reader based on the adjusted biometric authentication algorithm.

In some embodiments, the method 600 includes adjusting 608 the biometric authentication algorithm in response to the movement of the information handling device 102 crossing the threshold a second time, and the method 600 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   determine, by use of the processor, whether a movement speed of the apparatus crosses from a first side of a threshold to a second side of the threshold;
   in response to the movement speed of the apparatus crossing from the first side of the threshold to the second side of the threshold, adjust a biometric authentication algorithm to a first biometric authentication algorithm while the movement speed is on the second side of the threshold;
   determine whether the movement speed of the apparatus crosses back from the second side of the threshold to the first side of the threshold;
   in response to the movement speed of the apparatus crossing back from the second side of the threshold to the first side of the threshold, adjust the biometric authentication algorithm from the first biometric authentication algorithm to a second biometric authentication algorithm, wherein the first biometric authentication algorithm is different from the second biometric authentication algorithm; and
   control a biometric reader based on the adjusted biometric authentication algorithm.

2. The apparatus of claim 1, wherein the code executable by the processor adjusts the biometric authentication algorithm by ignoring authentication attempts made using the biometric reader after the movement speed of the apparatus crosses the threshold.

3. The apparatus of claim 2, wherein the code executable by the processor ignores the authentication attempts made using the biometric reader after the movement speed of the apparatus crosses the threshold by disabling authentication using the biometric reader after the movement speed of the apparatus crosses the threshold.

4. The apparatus of claim 2, wherein the code executable by the processor ignores the authentication attempts made using the biometric reader after the movement speed of the apparatus crosses the threshold by ignoring unsuccessful attempts made using the biometric reader after the movement speed of the apparatus crosses the threshold and accepting successful attempts made using the biometric reader after the movement speed of the apparatus crosses the threshold.

5. The apparatus of claim 1, wherein the code executable by the processor adjusts the biometric authentication algorithm by increasing a number of authentication attempts available to be made using the biometric reader after the movement speed of the apparatus crosses the threshold.

6. The apparatus of claim 1, wherein the code executable by the processor determines whether the movement speed of the information handling device crosses the threshold by determining whether the movement speed of the information handling device indicates a transition from a first movement pattern to a second movement pattern.

7. A method comprising:
   determining, by use of a processor, whether a movement speed of an information handling device crosses from a first side of a threshold to a second side of the threshold;
   in response to the movement speed of the information handling device crossing from the first side of the threshold to the second side of the threshold, adjusting a biometric authentication algorithm to a first biometric authentication algorithm while the movement speed is on the second side of the threshold;
   determining whether the movement speed of the information handling device crosses back from the second side of the threshold to the first side of the threshold;
   in response to the movement speed of the information handling device crossing back from the second side of the threshold to the first side of the threshold, adjusting the biometric authentication algorithm from the first biometric authentication algorithm to a second biometric authentication algorithm, wherein the first biometric authentication algorithm is different from the second biometric authentication algorithm; and
   controlling a biometric reader based on the adjusted biometric authentication algorithm.

8. The method of claim 7, wherein determining whether the movement speed of the information handling device crosses the threshold comprises determining whether the movement speed of the information handling device crosses an acceleration threshold.

9. The method of claim 7, wherein determining whether the movement speed of the information handling device crosses the threshold comprises determining whether the movement speed of the information handling device crosses a velocity threshold.

10. The method of claim 7, wherein determining whether the movement speed of the information handling device crosses the threshold comprises determining whether the movement speed of the information handling device indicates a transition from a first movement pattern to a second movement pattern.

11. The method of claim 7, wherein adjusting the biometric authentication algorithm comprises ignoring authentication attempts made using the biometric reader after the movement speed of the information handling device crosses the threshold.

12. The method of claim 11, wherein ignoring the authentication attempts made using the biometric reader after the movement speed of the information handling device crosses the threshold comprises disabling authentication using the biometric reader after the movement speed of the information handling device crosses the threshold.

13. The method of claim 11, wherein ignoring the authentication attempts made using the biometric reader after the movement speed of the information handling device crosses the threshold comprises ignoring unsuccessful attempts made using the biometric reader after the movement speed of the information handling device crosses the threshold and accepting successful attempts made using the biometric reader after the movement speed of the information handling device crosses the threshold.

14. The method of claim 7, wherein adjusting the biometric authentication algorithm comprises increasing a number of authentication attempts available to be made using the biometric reader after the movement speed of the information handling device crosses the threshold.

15. The method of claim 7, further comprising adjusting the biometric authentication algorithm in response to the movement speed of the information handling device crossing the threshold a second time.

16. A program product comprising a non-transitory computer readable storage medium that stores code executable by a processor, the executable code comprising code to perform:
   determining, by use of the processor, whether a movement speed of an information handling device crosses from a first side of a threshold to a second side of the threshold;
   in response to the movement speed of the information handling device crossing from the first side of the threshold to the second side of the threshold, adjusting a biometric authentication algorithm to a first biometric authentication algorithm while the movement speed is on the second side of the threshold;
   determining whether the movement speed of the information handling device crosses back from the second side of the threshold to the first side of the threshold;
   in response to the movement speed of the information handling device crossing back from the second side of the threshold to the first side of the threshold, adjusting the biometric authentication algorithm from the first biometric authentication algorithm to a second biometric authentication algorithm, wherein the first biometric authentication algorithm is different from the second biometric authentication algorithm; and
   controlling a biometric reader based on the adjusted biometric authentication algorithm.

17. The program product of claim 16, wherein the executable code further comprises code to perform determining whether the movement speed of the information handling device crosses the threshold by determining whether the movement speed of the information handling device crosses a threshold selected from a group comprising an acceleration threshold and a velocity threshold.

18. The program product of claim 16, wherein the executable code further comprises code to perform determining whether the movement speed of the information handling device crosses the threshold by determining whether the movement speed of the information handling device indicates a transition from a first movement pattern to a second movement pattern.

19. The program product of claim 16, wherein the executable code further comprises code to perform adjusting the biometric authentication algorithm by ignoring authentication attempts made using the biometric reader after the movement speed of the information handling device crosses the threshold.

20. The program product of claim 16, wherein the executable code further comprises code to perform adjusting the biometric authentication algorithm by increasing a number of authentication attempts available to be made using the biometric reader after the movement speed of the information handling device crosses the threshold.

* * * * *